US010972559B2

(12) United States Patent
Barbieri et al.

(10) Patent No.: US 10,972,559 B2
(45) Date of Patent: *Apr. 6, 2021

(54) SYSTEMS AND METHODS FOR PROVIDING RECOMMENDATIONS AND EXPLANATIONS

(71) Applicant: Oath Inc., New York, NY (US)

(72) Inventors: Nicola Barbieri, Barcelona (ES); Francesco Bonchi, Barcelona (ES); Giuseppe Manco, Settimo di Montalto Uffugo (IT)

(73) Assignee: Verizon Media Inc., New York, NY (US)

(*) Notice: Subject to any disclaimer, the term of this patent is extended or adjusted under 35 U.S.C. 154(b) by 118 days.

This patent is subject to a terminal disclaimer.

(21) Appl. No.: 16/284,294

(22) Filed: Feb. 25, 2019

(65) Prior Publication Data

US 2019/0230171 A1  Jul. 25, 2019

Related U.S. Application Data

(63) Continuation of application No. 14/444,477, filed on Jul. 28, 2014, now Pat. No. 10,218,800.

(51) Int. Cl.
| G06F 16/00 | (2019.01) |
| H04L 29/08 | (2006.01) |
| G06N 20/00 | (2019.01) |
| G06Q 50/00 | (2012.01) |
| G06Q 30/02 | (2012.01) |

(Continued)

(52) U.S. Cl.
CPC .......... *H04L 67/22* (2013.01); *G06F 16/9535* (2019.01); *G06N 20/00* (2019.01); *G06Q 30/0277* (2013.01); *G06Q 30/0631* (2013.01); *G06Q 50/01* (2013.01)

(58) Field of Classification Search
None
See application file for complete search history.

(56) References Cited

U.S. PATENT DOCUMENTS

2011/0302117 A1* 12/2011 Pinckney ............... G06N 20/00
706/12
2013/0031162 A1* 1/2013 Willis ................. H04L 65/1069
709/203

(Continued)

*Primary Examiner* — Bai D Vu
(74) *Attorney, Agent, or Firm* — Cooper Legal Group, LLC

(57) ABSTRACT

Provided herein is a system or method for a users-to-follow recommendation engine for, based at least in part on social network information and information about users in one or more social networks, determining features relating to users, including topical features and social features, determining, using a model constructed utilizing the determined features, for a set or users, a subset of the set of users for which the user has a high linkage, relative to other linkages in the set, and determining, using the model, and displaying to the user, a recommendation to follow and an associated explanation, of at least one particular user of the subset of the users wherein the associated explanation includes a topical-based explanation when a predominant basis for the high linkage is determined to be topical and a social-based explanation when a predominant basis for the high linkage is determined to be social.

20 Claims, 10 Drawing Sheets

(51) Int. Cl.
*G06Q 30/06* (2012.01)
*G06F 16/9535* (2019.01)

(56) References Cited

U.S. PATENT DOCUMENTS

| | | | |
|---|---|---|---|
| 2013/0097246 A1* | 4/2013 | Zifroni | H04W 4/21 |
| | | | 709/204 |
| 2013/0124437 A1* | 5/2013 | Pennacchiotti | G06N 20/00 |
| | | | 706/12 |
| 2014/0025692 A1* | 1/2014 | Pappas | G06F 16/00 |
| | | | 707/754 |
| 2014/0297479 A1* | 10/2014 | McCloskey | G06Q 30/0627 |
| | | | 705/26.63 |
| 2016/0034936 A1* | 2/2016 | Bryant, III | G06Q 50/01 |
| | | | 705/14.16 |

* cited by examiner

SYSTEMS AND METHODS FOR PROVIDING RECOMMENDATIONS AND EXPLANATIONS

CROSS REFERENCE TO RELATED APPLICATION

This application claims priority to and is a continuation of U.S. application Ser. No. 14/444,477, filed on Jul. 28, 2014, entitled "SYSTEMS AND METHODS FOR PROVIDING RECOMMENDATIONS AND EXPLANATIONS", which is incorporated herein.

BACKGROUND

Online social networking plays an important role in todays connected world. Users increasingly rely on social networking platforms to maintain existing contacts and grow their networks. Social networking platforms utilizing link prediction for user recommendations help users grow theirs networks faster, driving engagement and loyalty.

SUMMARY

An aspect of some embodiments of the invention provides a system comprising one or more processors and a non-transitory storage medium comprising program logic for execution by the one or more processors the program logic comprising a users-to-follow recommendation engine for, based at least in part on social network information and information about users in one or more social networks, determining features relating to users, including topical features and social features, determining, using a model constructed utilizing the determined features, for a set or users, a subset of the set of users for which the user has a high linkage, relative to other linkages in the set, and determining, using the model, and displaying to the user, a recommendation to follow and an associated explanation, of at least one particular user of the subset of the users wherein the associated explanation includes a topical-based explanation when a predominant basis for the high linkage is determined to be topical and a social-based explanation when a predominant basis for the high linkage is determined to be social.

An aspect of some embodiments of the invention provides a method comprising, based at least in part on social network information and information about users in one or more social networks, determining features relating to a user, including topical features and social features, constructing a machine learning based model utilizing the determined features, determining, using the model, for a set of users, a subset of the set of users for which the user has a high linkage, relative to linkages of the user to other users in the set, and determining, using the model, and displaying to the user, a recommendation to follow and an associated explanation, of at least one particular user of the subset of the users wherein the associated explanation includes a topical-based explanation when a predominant basis for the high linkage is determined to be topical and a social-based explanation when a predominant basis for the high linkage is determined to be social.

An aspect of some embodiments of the invention provides a non-transitory computer-readable storage medium or media tangibly storing computer program logic capable of being executed by a computer processor, the program logic comprising users-to-follow recommendation engine logic for, based at least in part on social network information and information about users in one or more social networks, determining features relating to a user, including topical features and social features, determining, using a model constructed utilizing the determined features, for a set of users, a subset of the set of users for which the user has a high linkage, relative to linkages of the user to other users in the set, and determining, using the model, and displaying to the user, a recommendation to follow and an associated explanation, of at least one particular user of the subset of the users wherein the associated explanation includes a topical-based explanation when a predominant basis for the high linkage is determined to be topical and a social-based explanation when a predominant basis for the high linkage is determined to be social.

While the invention is described with reference to the above drawings, the drawings are intended to be illustrative, and the invention contemplates other embodiments within the spirit and scope of the invention.

DETAILED DESCRIPTION

The invention now will be described more fully hereinafter with reference to the accompanying drawings, which form a part hereof, and which show, by way of illustration, embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in an embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. The word "feature" can include features in a general, non-technical sense, as well as features in technical senses, such as, for example, features used in models such as machine learning models.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

Figure 1:
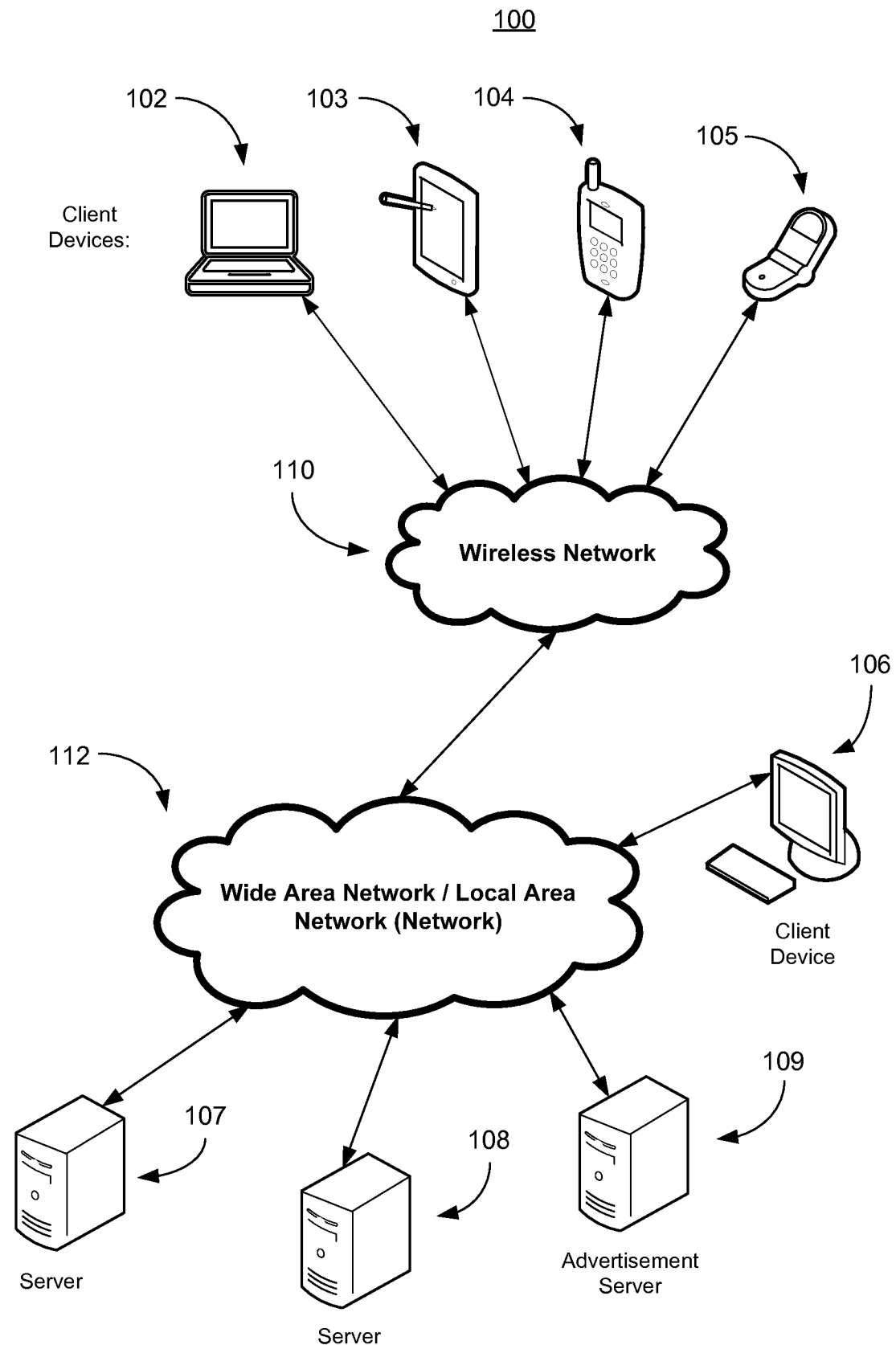
FIG. 1 illustrates a block diagram of a distributed computer system that can implement one or more aspects of a Users-To-Follow Recommendation system or method according to an embodiment of the invention.

FIG. 1 illustrates components of an embodiment of an environment in which the invention may be practiced. Not all of the components may be required to practice the invention, and variations in the arrangement and type of the components may be made without departing from the spirit or scope of the invention. As shown, the system 100 includes one or more local area networks ("LANs")/wide area networks ("WANs") 112, one or more wireless networks 110, one or more wired or wireless client devices 106, mobile or other wireless client devices 102-106, servers 107-108, including for example a Users-To-Follow Recommendation server, and one or more advertisement servers 109, and may include or communicate with one or more data stores or databases. Some of the client devices 102-106 may include, for example, desktop computers, laptop computers, set top boxes, tablets, cell phones, smart phones, etc. The servers 107-109 can include, for example, one or more application servers, content servers, search servers, etc.

An advertisement server can include, for example, a computer server that has a role in connection with online advertising, such as, for example, in obtaining, storing, determining, configuring, selecting, ranking, retrieving, targeting, matching, serving and presenting online advertisements, for example, in connection with recommendations on who to follow, to users, such as on websites, in applications, and other places where users will see them.

Figure 2:
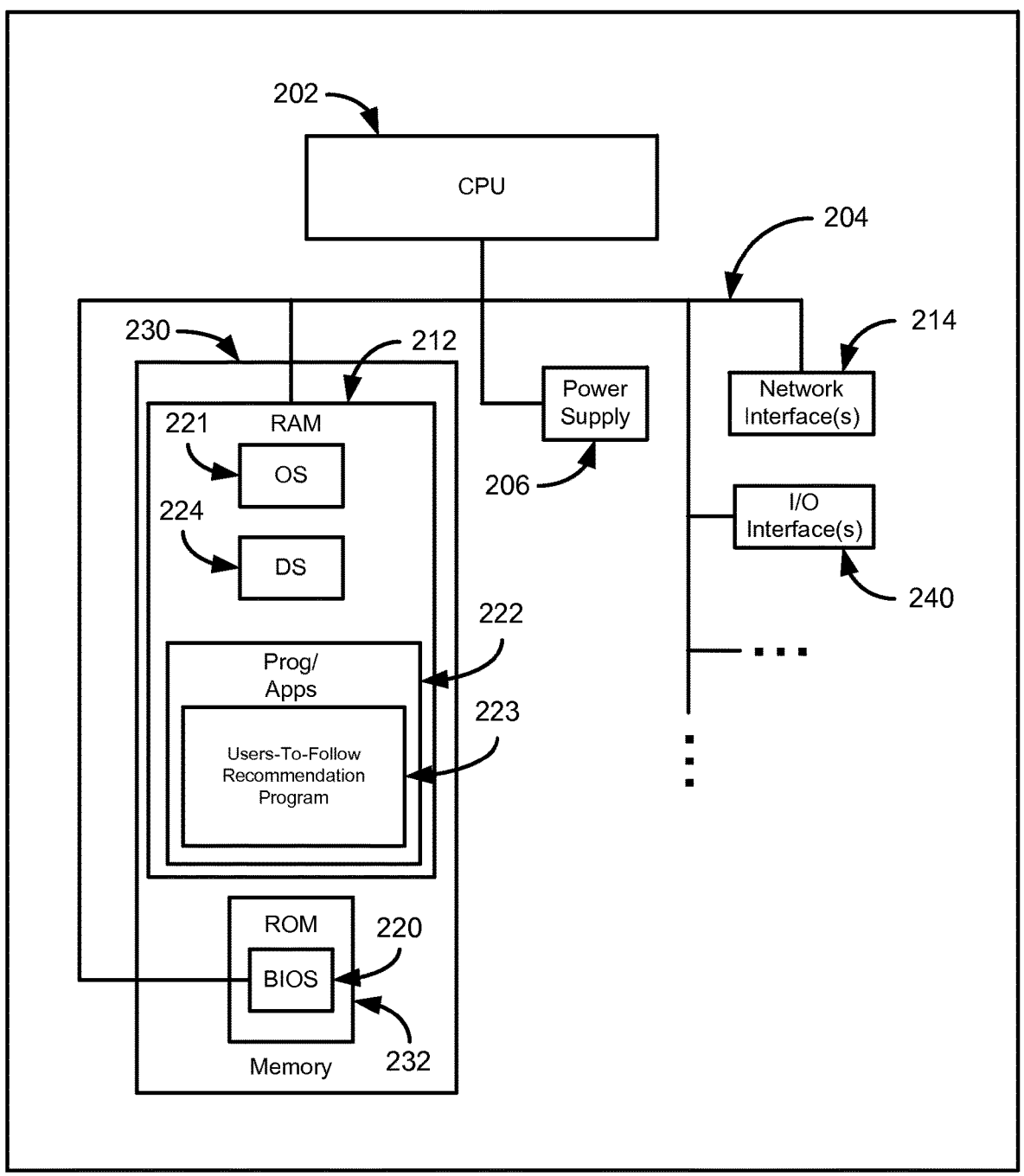
FIG. 2 illustrates a block diagram of an electronic device that can implement one or more aspects of a Users-To-Follow Recommendation system or method according to an embodiment of the invention.

FIG. 2 illustrates a block diagram of an electronic device 200 that can implement one or more aspects of a Users-To-Follow Recommendation system or method according to an embodiment of the invention. Instances of the electronic device 200 may include servers, e.g. servers 107-109, and client devices, e.g. client devices 102-106. In general, the electronic device 200 can include a processor 202, memory 230, a power supply 206, and input/output (I/O) components 240, e.g., microphones, speakers, displays, touchscreens, keyboards, keypads, GPS components, etc., which may be operable, for example, to provide graphical user interfaces. The electronic device 200 can also include a communications bus 204 that connects the aforementioned elements of the electronic device 200. Network interfaces 214 can include a receiver and a transmitter (or transceiver), and an antenna for wireless communications.

The processor 202 can include one or more of any type of processing device, e.g., a central processing unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an application specific integrated circuit (ASIC), a programmable/programmed logic device, memory device containing instructions, etc., or combinatorial logic embodied in hardware. Furthermore, logic may also be fully embodied as software.

The memory 230, which can include RAM 212 and ROM 232, can be enabled by one or more of any type of memory device, e.g., a primary (directly accessible by the CPU) or secondary (indirectly accessible by the CPU) storage device (e.g., flash memory, magnetic disk, optical disk). The RAM can include an operating system 221, data storage 224, which may include one or more databases, and programs and/or applications 222, which can include, for example, software aspects of the Users-To-Follow Recommendation Program 223. The ROM 232 can also include BIOS 220 of the electronic device.

The Users-To-Follow Recommendation Program 223 is intended to broadly include or represent all programming, applications, algorithms, software and other tools necessary to implement or facilitate methods and systems according to embodiments of the invention. The elements of the Users-To-Follow Recommendation Program 223 may exist on a single server computer or be distributed among multiple computers or devices or entities, which can include advertisers, publishers, data providers, etc.

The power supply 206 contains one or more power components, and facilitates supply and management of power to the electronic device 200.

The input/output components, including I/O interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, and one or more input/output interfaces. A network care, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of link prediction and users-to-follow recommendations, via a network to another device. Also, an application server may, for example, host a Web site that can provide a user interface for administration of example aspects of link prediction and user-to-follow recommendations.

Any computing device capable of sending, receiving, and processing data over a wired and/or a wireless network may act as a server, such as in facilitating aspects of implementations of link prediction and user-to-follow recommendations. Thus, devices acting as a server may include devices such as dedicated rack-mounted servers, desktop computers, laptop computers, set top boxes, integrated devices combining one or more of the preceding devices, etc.

Servers may vary in widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, etc.

A server may include, for example, a device that is configured, or includes a configuration, to provide data or content via one or more networks to another device, such as in facilitating aspects of an example Users-To-Follow Recommendation System. One or more servers may, for example, be used in hosting a Web site, such as the Yahoo! Web site. One or more servers may host a variety of sites, such as, for example, business sites, informational sites, social networking sites, educational sites, wikis, financial sites, government sites, personal sites, etc.

Servers may also, for example, provide a variety of services, such as Web services, third-party services, audio services, video services, email services, instant messaging (IM) services, SMS services, MMS services, FTP services, voice or IP (VOIP) services, calendaring services, phone services, advertising services etc., all of which may work in conjunction with example aspects of an example Users-To-Follow Recommendation System. Content may include, for example, text, images, audio, video, advertisements and recommendations on who to follow, etc.

In example aspects of link prediction and user-to-follow recommendations, client devices may include, for example, any computing device capable of sending and receiving data over a wired and/or a wireless network. Such client devices may include desktop computers as well as portable devices such as cellular telephones, smart phones, display pagers, radio frequency (RF) devices, infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, etc.

Client devices, as may be used in example Users-To-Follow Recommendation Systems, may range widely in terms of capabilities and features. For example, a cell phone, smart phone or tablet may have a numeric keypad and a few lines of monochrome LCD display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in example Users-To-Follow Recommendation Systems, including aspects of link prediction, user-to-follow recommendations and explanations, may run a variety of operating systems, including personal computer operating systems such as Windows, iOS or Linux, and mobile operating systems such as iOS, Android, and Windows Mobile, etc. Client devices may be used to run one or more applications that are configured to send or receive data from another computing device. Client applications may provide and receive textual content, multimedia information, etc. Client applications may perform actions such as browsing webpages, using a web search engine, sending and receiving messages via email, SMS, or MMS, playing games (such as fantasy sports leagues), receiving advertising, watching locally stored or streamed video, or participating in social networks.

In example aspects of link prediction, user-to-follow recommendations and explanations, one or more networks, such as networks 110 or 112, for example, may couple servers and client devices with other computing devices, including through wireless network to client devices. A network may be enabled to employ any form of computer readable media for communicating information from one electronic device to another. A network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as wireless network 110, as in an example Users-To-Follow Recommendation System, may couple devices with a network. A wireless network may employ stand-alone ad-hoc networks, mesh networks, Wireless LAN (WLAN) networks, cellular networks, etc.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, etc. Access technologies such as 2G, 2.5G, 3G, 4G, and future access networks may enable wide area coverage for client devices, such as client devices with various degrees of mobility. For example, wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, etc. A wireless network may include virtually any wireless communication mechanism by which information may travel between client devices and another computing device, network, etc.

Internet Protocol may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), wide area networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site A "content delivery network" or "content distribution network" (CDN), as may be used in an example Users-To-Follow Recommendation System, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Some embodiments include direct or indirect use of social networks and social network information, such as in targeted advertising or link prediction and recommendation selection. A "Social network" refers generally to a network of acquaintances, friends, family, colleagues, and/or coworkers, and potentially the subsequent connections within those networks. A social network, for example, may be utilized to find more relevant connections for a variety of activities, including, but not limited to, dating, job networking, receiving or providing service referrals, content sharing, creating new associations or maintaining existing associations with like-minded individuals, finding activity partners, performing or supporting commercial transactions, etc.

A social network may include individuals with similar experiences, opinions, education levels and/or backgrounds, or may be organized into subgroups according to user profile, where a member may belong to multiple subgroups. A user may have multiple "1:few" circles, such as their family, college classmates, or coworkers.

A person's online social network includes the person's set of direct relationships and/or indirect personal relationships. Direct personal relationships refers to relationships with people the user communicates with directly, which may include family members, friends, colleagues, coworkers, and the like. Indirect personal relationships refers to people with whom a person has not had some form of direct contact, such as a friend of a friend, or the like. Different privileges and permissions may be associated with those relationships. A social network may connect a person with other people or entities, such as companies, brands, or virtual persons. A person's connections on a social network may be represented visually by a "social graph" that represents each entity as a node and each relationship as an edge.

Link prediction includes the task of estimating the likelihood of the existence of an unobserved link between two nodes, based on the other observable links around the two nodes and, when available, the attributes of the nodes in a network. Recommendation selection includes recommending a user to follow along with an explanation for the recommendation.

Users may interact with social networks through a variety of devices. Multi-modal communications technologies may enable consumers to engage in conversations across multiple devices and platforms, such as cell phones, smart phones, tablet computing devices, personal computers, televisions, SMS/MMS, email, instant messenger clients, forums, and social networking sites (such as Facebook, Twitter, and Google+), or others.

In some example Users-To-Follow Recommendation System, various monetization techniques or models may be used in connection with contextual or non-search related advertising, as well as in sponsored search advertising, including advertising associated with user search queries, and non-sponsored search advertising, including graphical or display advertising. In an auction-based online advertising marketplace, advertisers may bid in connection with placement of advertisements and recommendations on who to follow, although many other factors may also be included in determining advertisement or recommendation selection or ranking. Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties.

For Web portals, such as Yahoo!, advertisements and recommendations on who to follow may be displayed on web pages resulting from a user-defined search based upon one or more search terms. Such advertising is most beneficial to users, advertisers and web portals when the displayed advertisements and recommendations on who to follow are relevant to the web portal user's interests. Thus, a variety of techniques have been developed to infer the user's interests/intent and subsequently target the most relevant advertising to that user.

One approach to improving the effectiveness of presenting recommendations on who to follow to users interested in receiving information is to employ demographic characteristics (i.e., age, income, sex, occupation, etc.) for predicting the behavior of groups of different users. Advertisements and recommendations on who to follow may be presented to each user in a targeted audience based upon predicted behaviors rather than in response to certain keyword search terms.

Another approach is profile-based ad targeting. In this approach, user profiles specific to each user are generated to model user behavior, for example, by tracking each user's path through a web site or network of sites, and then compiling a profile based on what pages and recommendations on who to follow were delivered to the user. Using aggregated data, a correlation develops between users in a certain target audience and the products that those users purchase. The correlation then is used to target potential purchasers by targeting content or recommendations on who to follow to the user at a later time.

During the presentation of recommendations on who to follow, the presentation system may collect detailed information about the type of advertisements and recommendations on who to follow presented to the user. This information may be used for gathering analytic information on the advertising or potential advertising within the presentation. A broad range of analytic information may be gathered, including information specific to the advertising presentation system. Advertising analytics gathered may be transmitted to locations remote to the local advertising presentation system for storage or for further analysis. Where such advertising analytics transmittal is not immediately available, the gathered advertising analytics may be saved by the advertising presentation system until the transmittal of those advertising analytics becomes available.

Figure 3:
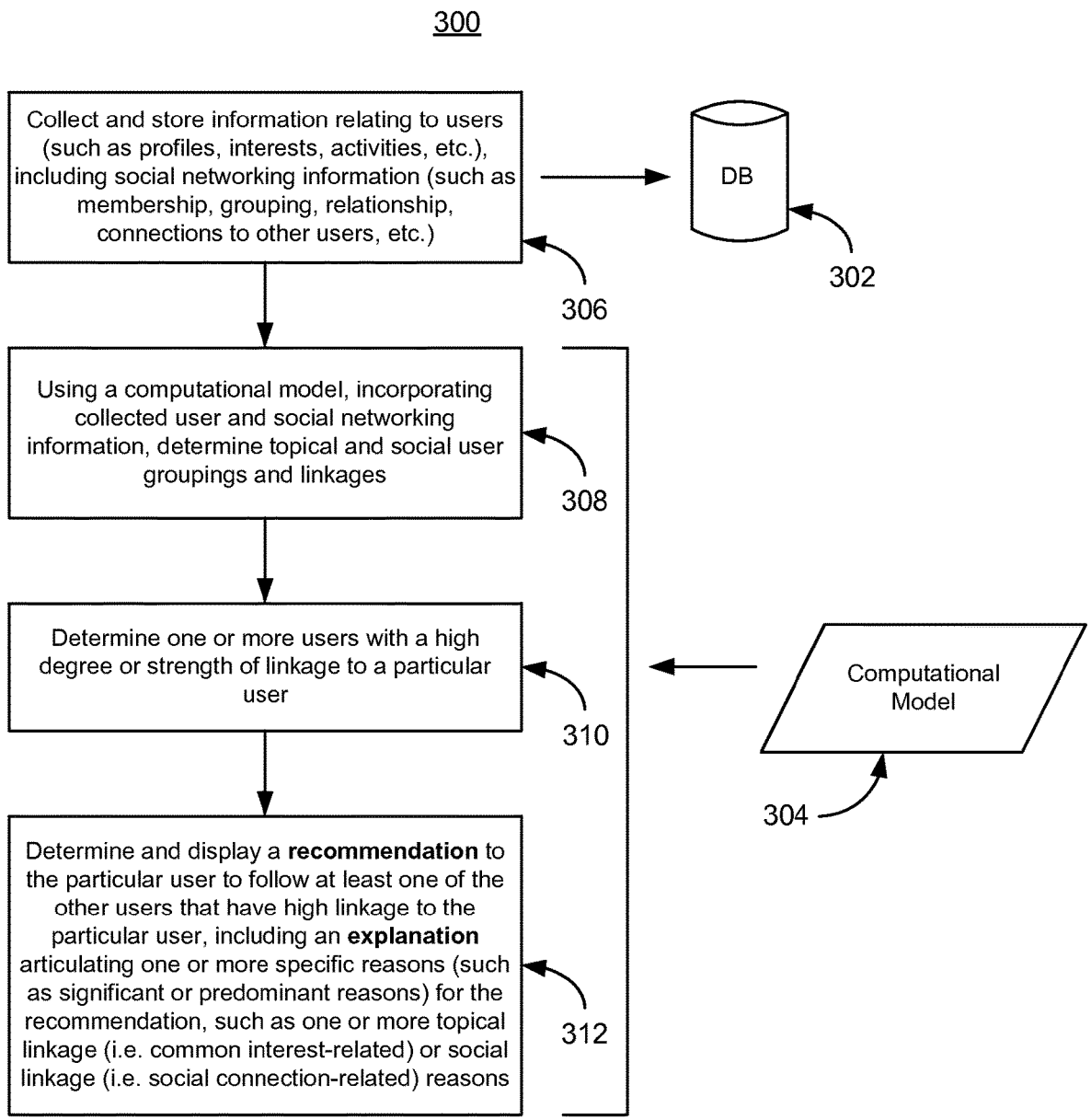
FIGS. 3-8 illustrate flow diagrams of example operations of one or more aspects of a Users-To-Follow Recommendation system or method according to an embodiment of the invention.

FIG. 3 illustrates a flow diagram 300 of example operations of one or more aspects of a Users-To-Follow Recommendation system or method according to an embodiment of the invention, including DB 302, and Computational Model 304.

At step 306, a Users-To-Follow Recommendation Engine (not shown), according to an aspect of an embodiment of the invention, collects and stores in DB 302, information relating to users, including for example, profiles, interests, activities, or the like, and social networking information, including for example, membership, grouping, relationship, connections to other users, or the like.

At step 308, the engine, using a computational model, incorporating collected user and social networking information, determines topical and social user groupings and linkages.

At step 310, the engine determines one or more users with a high degree or strength of linkage to a particular user.

At step 312, the engine determines and displays a recommendation to the particular user to follow at least one of the other users that have high linkage to the particular user, including an explanation articulating one or more specific reasons, for example, significant or predominant reasons, for the recommendation, such as topical linkage, including common interest-related linking, or social linkage, including social connection-related linking reasons.

Figure 4:
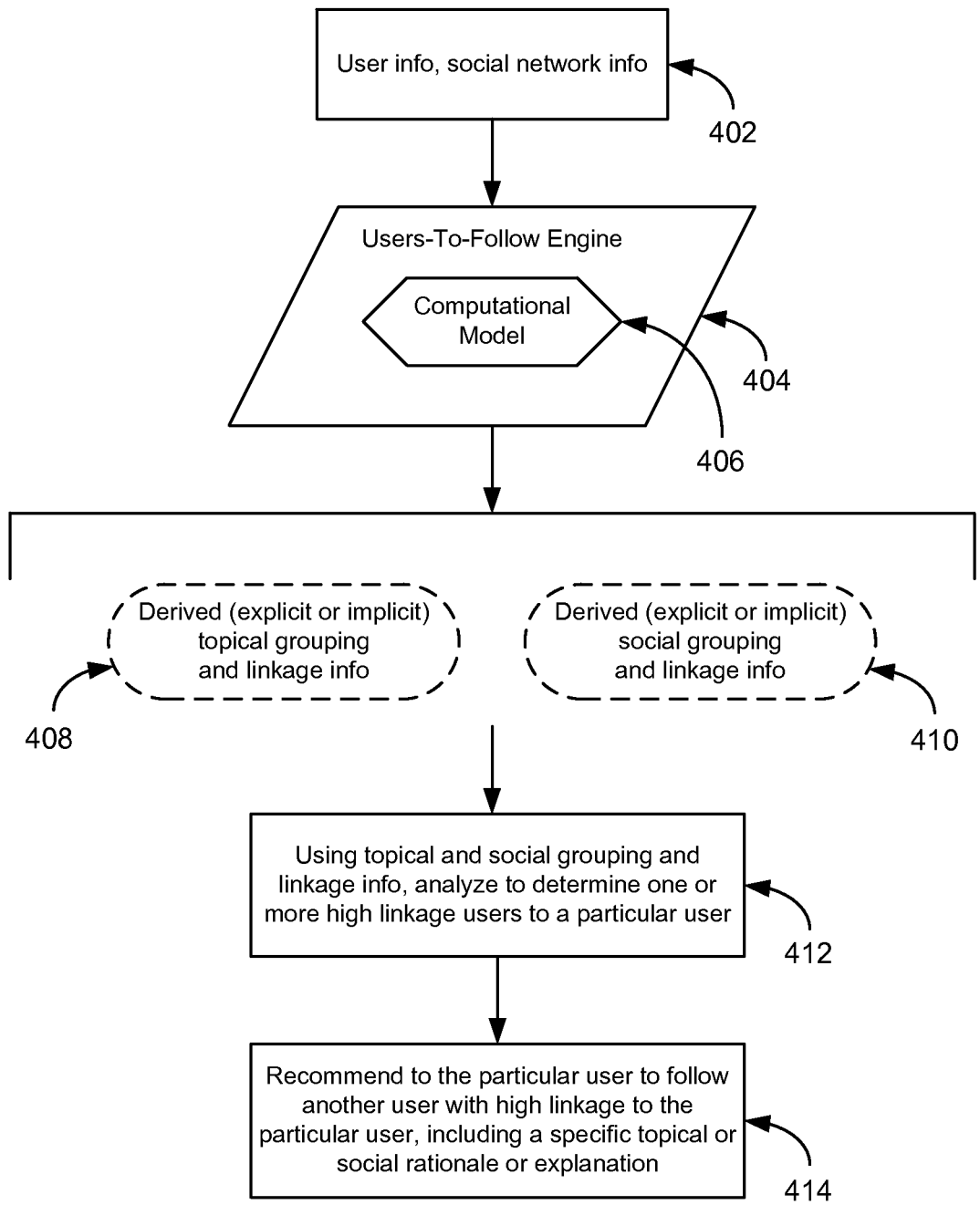

FIG. 4 illustrates a flow diagram 400 of example operations of one or more aspects of a Users-To-Follow Recommendation system or method according to an embodiment of the invention, including User and social network information 402, a Users-To-Follow Engine 404 and a Computational Model 406.

At step 408, the engine 404 uses derives and stores, explicit or implicit, topical grouping and linkage information.

At step 410, the engine 404 derives and stores, explicit or implicit, social grouping and linkage information.

At step 412, the engine 404, using topical and social grouping and linkage info, analyzes to determine one or more high linkage users to a particular user.

At step 414, the engine 404 recommends to the particular user to follow another user with high linkage to the particular user, including a specific topical or social rationale or explanation.

Figure 5:
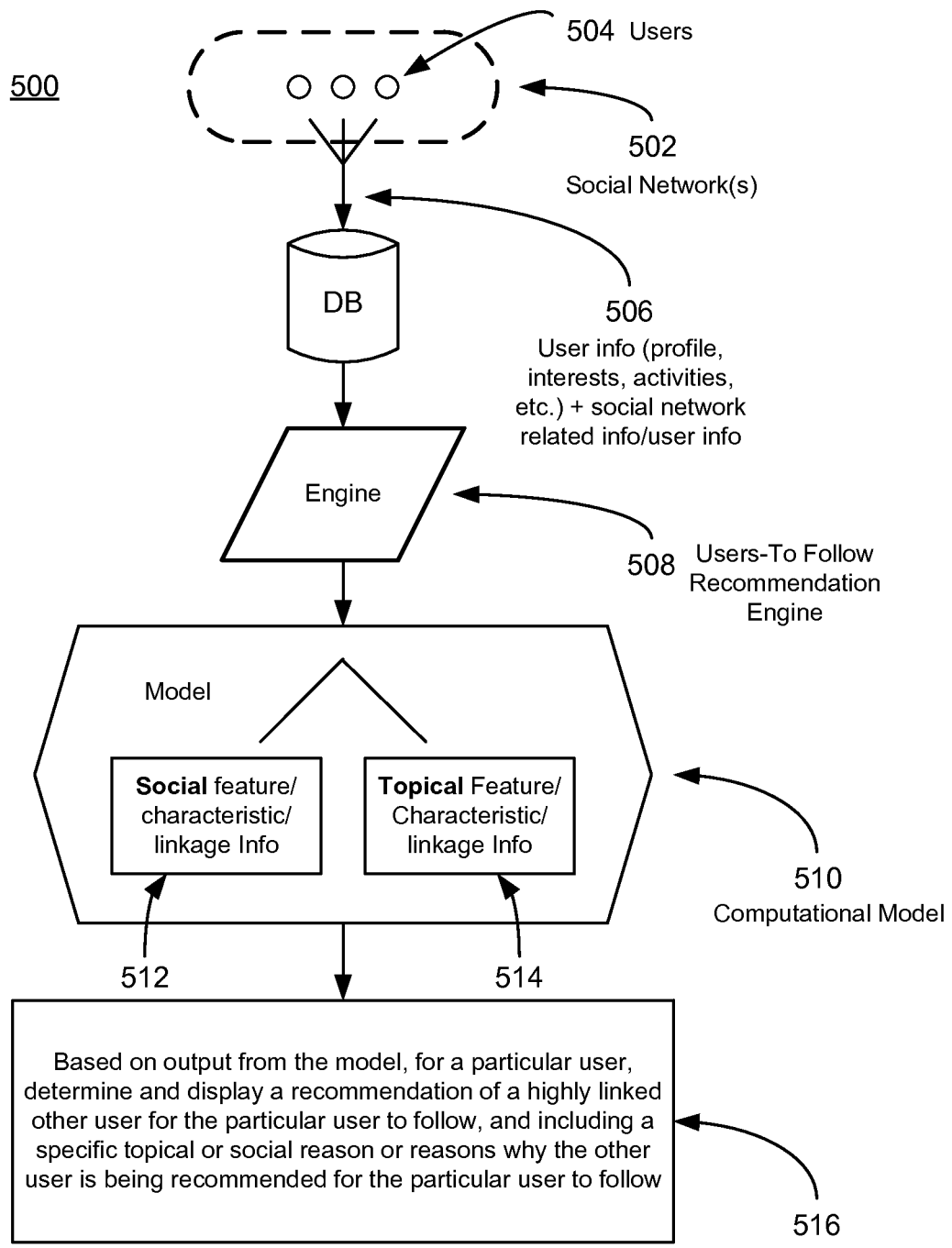

FIG. 5 illustrates a flow diagram 500 of example operations of one or more aspects of a Users-To-Follow Recommendation system or method according to an embodiment of the invention, including Social Network(s) 502, Users 504, Database (DB) 506, Users-To-Follow Recommendation Engine 508, and Computational Model 510, including Social feature Information 512 and Topical Feature Information 514. At step 516, engine 508, based on output from model 510, for a particular user, determines and displays a recommendation of a highly linked other user for the particular user to follow, along with a specific topical or social reason or reasons as to why the other user is being recommended for the particular user to follow.

Figure 6:
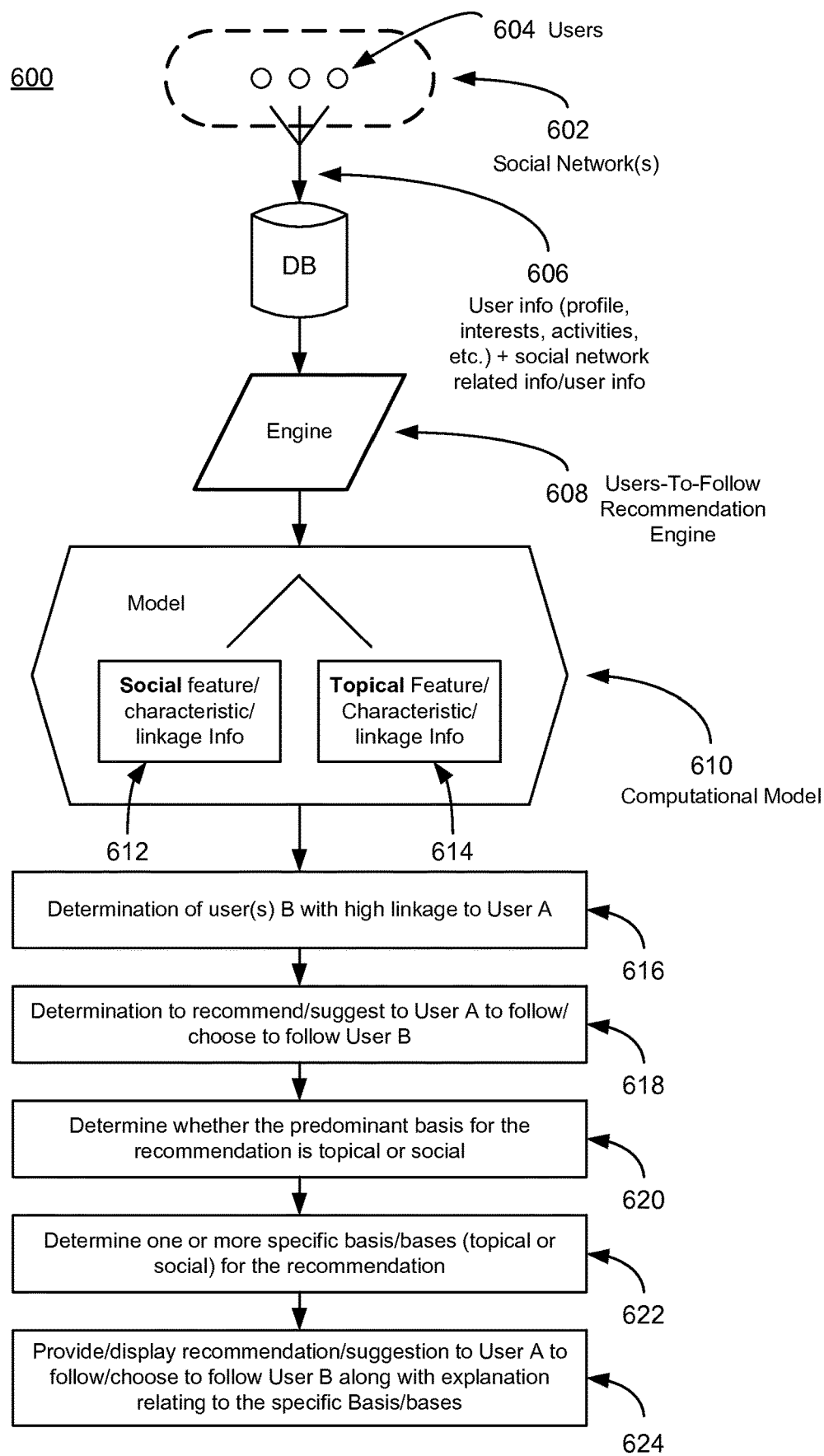

FIG. 6 illustrates a diagram 600 of example operations of one or more aspects of a Users-To-Follow Recommendation system or method according to an embodiment of the invention, including Social Network(s) 602, Users 604, Database (DB) 606, Users-To-Follow Recommendation Engine 608, and Computational Model 610, including Social feature Information 612 and Topical Feature Information 614. At step 616, the engine determines one or more Users B with high linkage to User A. At step 618, the engine determines to recommend or suggest to User A to follow or choose to follow User B. At step 620, the engine determines whether the predominant basis for the recommendation is topical or social. At step 622, the engine determines one or more specific basis, topical or social, for the recommendation. At step 624, the engine provides and displays the recommendation or suggestion to User A to follow or choose to follow User B along with an explanation relating to the specific basis for the recommendation.

Figure 7:
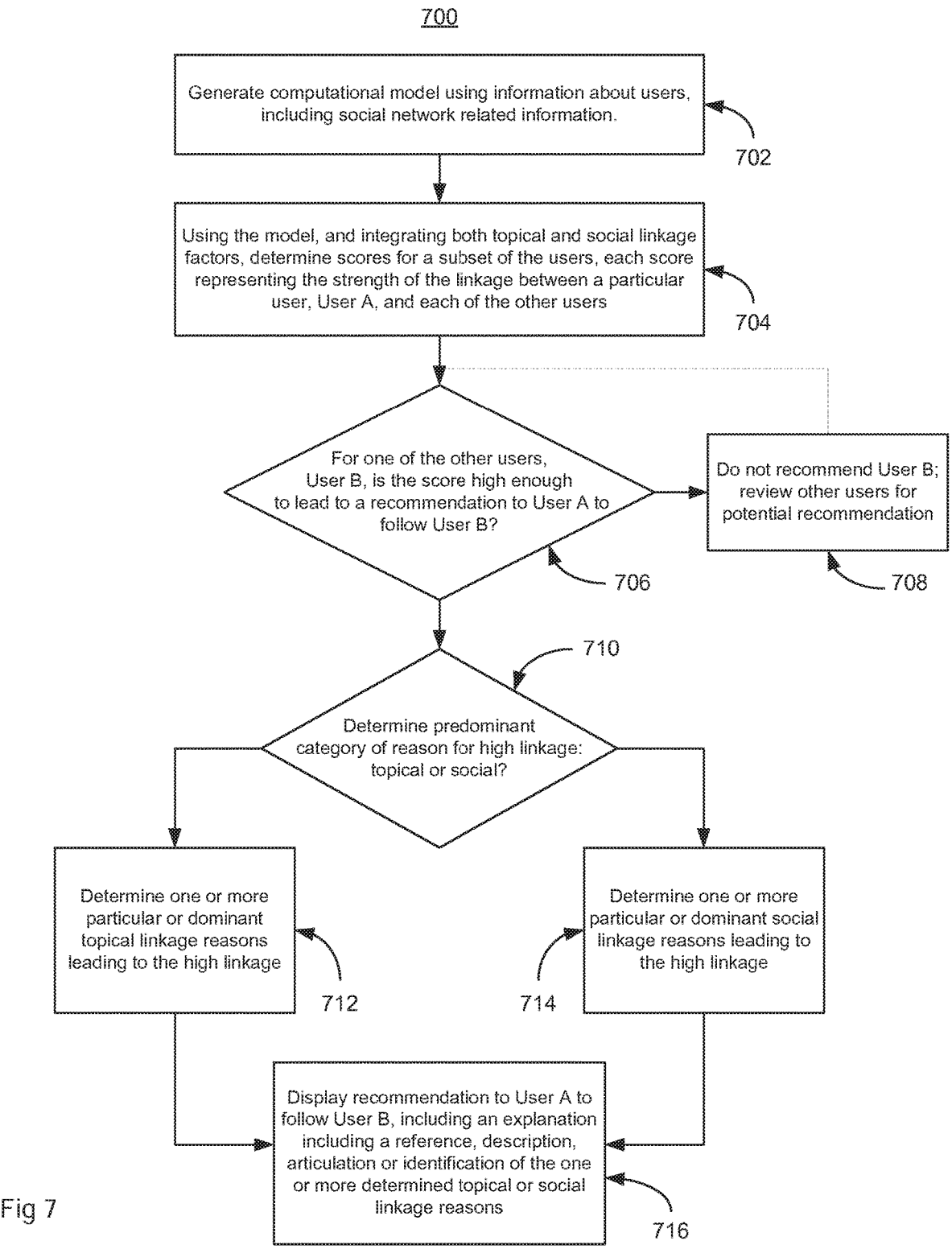

FIG. 7 illustrates a flow diagram 700 of example operations of one or more aspects of a Users-To-Follow Recommendation system or method according to an embodiment of the invention, performed, for example, by a Users-To-Follow Engine.

At step 702, the engine generates a computational model using information about users, including social network related information. At step 704, the engine, using the model, and integrating both topical and social linkage factors, determines scores for a subset of the users, each score representing the strength of the linkage between a particular user, User A, and each of the other users.

At step 706, the engine determines whether for one of the other users, User B, is the score high enough to lead to a recommendation to User A to follow User B. If not, at step 708, the engine does not recommend User B and reviews other users for potential recommendation. Otherwise, at step 710, the engine determines whether a predominant category of reason for high linkage is topical or social.

At step 712, the engine determines one or more particular or dominant topical linkage reasons leading to the high linkage. At step 714, the engine determines one or more particular or dominant social linkage reasons leading to the high linkage.

At step 716, the engine displays a recommendation or suggestion to User A to follow User B, including an explanation including a reference, description, articulation or identification of the one or more determined topical or social linkage reasons.

Figure 8:
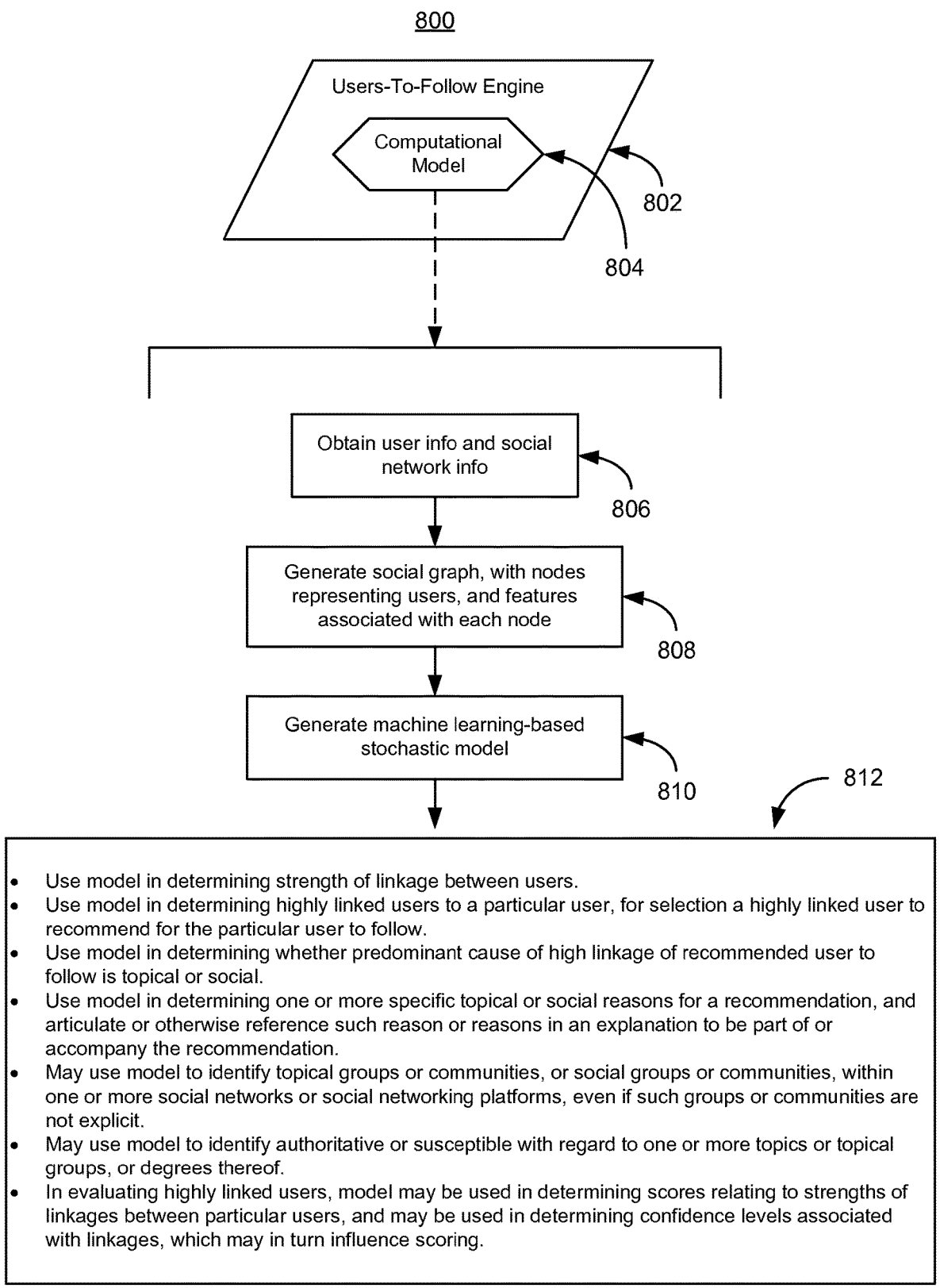

FIG. 8 illustrates a flow diagram 800 of example operations of one or more aspects of a Users-To-Follow Recommendation system or method according to an embodiment of the invention, including a Users-To-Follow Engine 802 and a Computational Model 804.

At step 806, the engine 802 obtains user information and social network information.

At step 808, the engine 802 generates a social graph, with nodes representing users, and features associated with each node.

At step 810, the engine 802 generates a machine learning-based stochastic model.

At step 812, various steps may be performed using the model, including, for example, determining strength of linkage between users, determining highly linked users to a particular user, for selection of a highly linked user to recommend for the particular user to follow, determining whether a predominant cause of high linkage of recommended user to follow is topical or social, determining one or more specific topical or social reasons for a recommendation, and articulate or otherwise reference such reason or reasons in an explanation to be part of, or accompanying the recommendation, using the model to identify topical groups or communities, or social groups or communities, within one or more social networks or social networking platforms, even if such groups or communities are not explicit, using the model to identify authoritative or susceptible with regard to one or more topics or topical groups, or degrees thereof. In evaluating highly linked users, the model may be used in determining scores relating to strengths of linkages between particular users, and may be used in determining confidence levels associated with linkages, which may in turn influence scoring.

Figure 9:
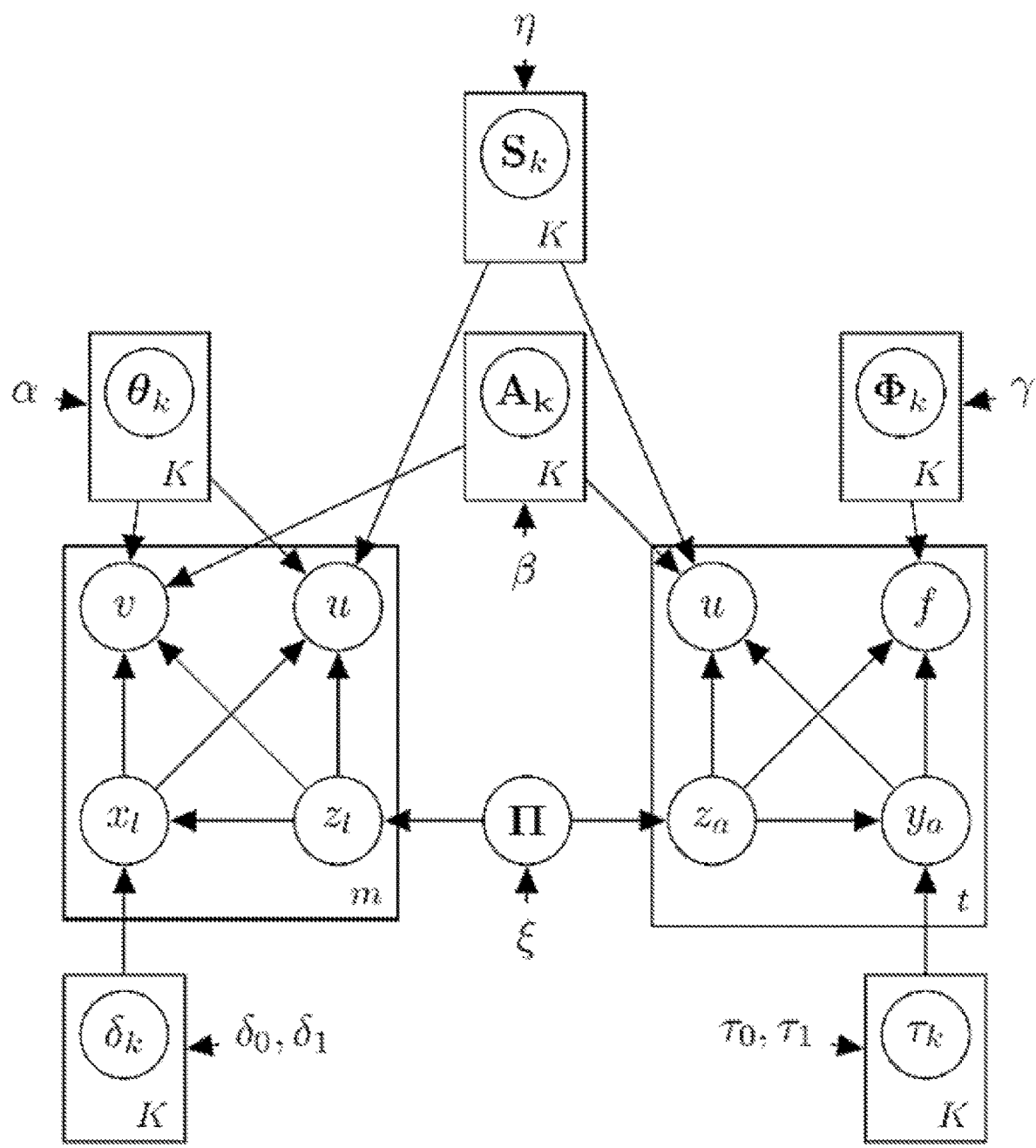
FIG. 9 illustrates a diagram of example operations of one or more aspects of a Users-To-Follow Recommendation system or method according to an embodiment of the invention.

FIG. 9 illustrates a diagram 900 of an example model, in plate notation, of an aspect of a Users-To-Follow Recommendation system or method, according to an embodiment of the invention, including causal dependencies among latent and observed variables in the generative process for social links and adoption features based on components θ, A, S and Φ where the generative process is governed by components including multinomial and Bernoulli distributions. These latent factors or variables can be abstractly thought as topics or communities, and the terms latent factors, topics and communities are used interchangeably herein.

In FIG. 9, a multinomial distribution variable, denoted as Π, over a fixed number of K latent factors, generates latent community-assignments $z_l$ and $z_a$, for each link $l \in E$ and for each adoption of feature $a \in F$.

A multinomial distribution variables denoted as $\theta_k$, $A_k$ and $S_k$ over the set of user V, and specify, respectively, the degree of sociality, authority and susceptibility of each user within k.

A multinomial probability variable denoted as $\Phi_k$ over F specifies the likelihood of observing each feature within the community k.

A degree of sociality variable denoted by $\delta_k$ measures the likelihood of observing social and/or topical connections within each community k. Although not shown, a topicality variable may be denoted as $1-\delta_k$.

An authoritative attitude variable is denoted by $\tau_k$ and refers to observing the adoption of an attribute by authoritative subject in k. Although not shown, a susceptible attitude variable may be denoted as $1-\tau_k$.

Additionally, in some embodiments, $z_l$ may refer to link assignments, $x_l$ may refer to social links (and $1-x_l$ may refer to topical links), $z_a$ may refer to feature assignments and $y_a$ may refer to feature adoption.

Figure 10:
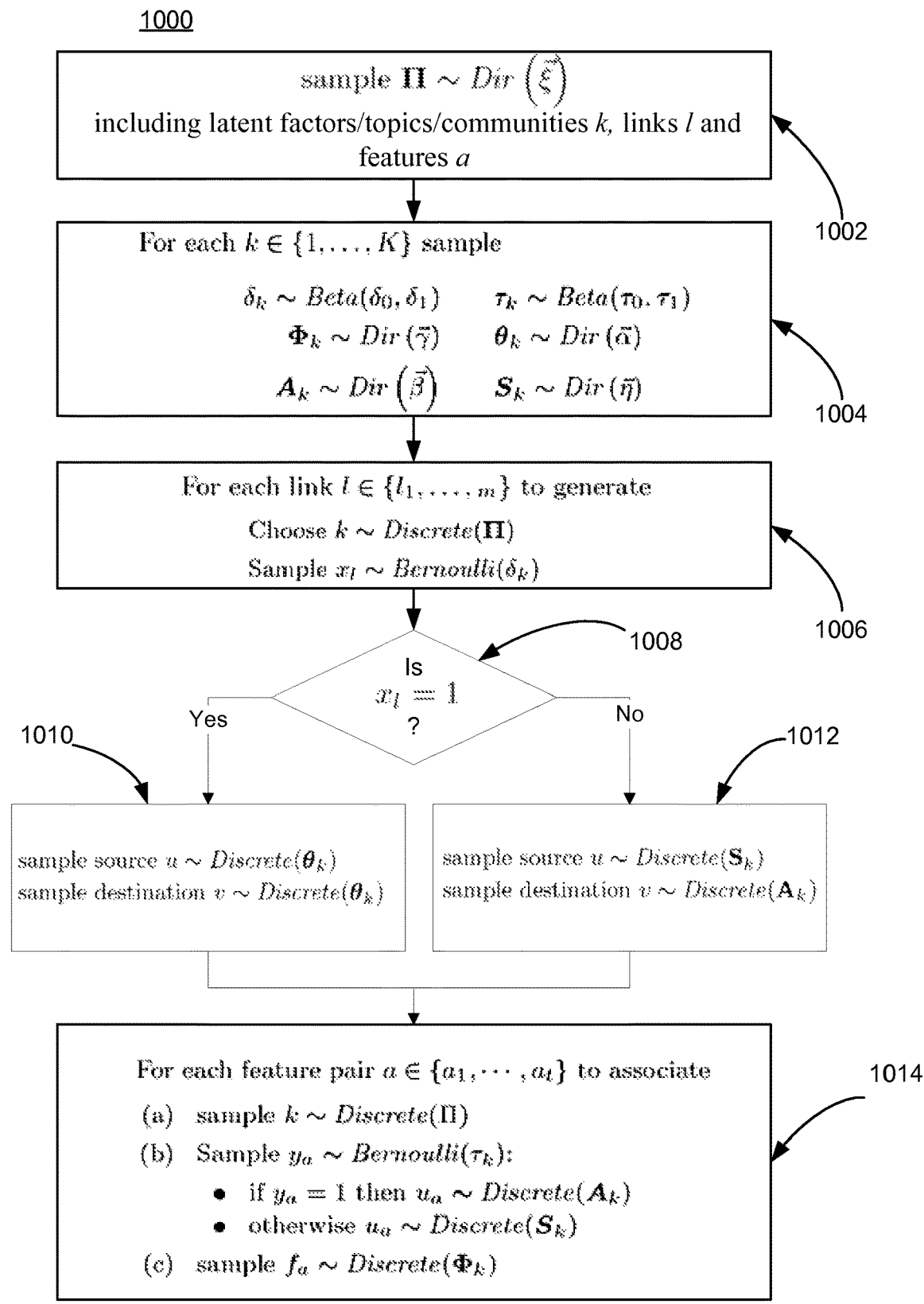
FIG. 10 illustrates a flow diagram of example operations of one or more aspects of a Users-To-Follow Recommendation system or method according to an embodiment of the invention.

FIG. 10 illustrates a flow diagram 1000 of example operations of one or more aspects of a Users-To-Follow Recommendation system or method according to an embodiment of the invention, including a generative process for social links and adoption features, related to the components illustrated and described with respect to FIG. 9.

At step 1002, the engine samples Π~Dir (ξ), including latent factors/topics/communities k, links l and features a.

At step 1004, for each $k \in \{1, \ldots, K\}$, the engine samples $\delta_k$~Beta $(\delta_0, \delta_1)$, $\tau_k$~Beta $(\tau_0, \tau_1)$, $\Phi k$~Dir ($\vec{\gamma}$), $\theta k$~Dir ($\vec{\alpha}$), $Ak$~Dir ($\vec{\beta}$), and $S_k$~Dir ($\vec{\eta}$).

At step 1006, for each link $l \in \{l_1, \ldots, m\}$ to generate, the engine chooses k~Discrete(Π) and samples $x_l$~Bernoulli $(\delta_k)$.

At step 1006, the engine determines if $x_l=1$. If yes, the engine proceeds to step 1010, otherwise the engine proceeds to step 1012.

At step 1010, where $x_l=1$, the engine samples source u~Discrete($\theta_k$) and samples destination v~Discrete(Ok).

At step 2012, where $x_l \neq 1$, the engine samples source u~Discrete($S_k$) and samples destination v~Discrete($A_k$).

At step 2014, for each feature pair $a \in \{a_1, \ldots, a_f\}$ to associate, the engine samples k~Discrete(H), samples $y_a$~Bernoulli($\tau_k$), and samples $f_a$~Discrete($\Phi_k$). When sampling $y_a$~Bernoulli($\tau_k$), if $y_a=1$ then $u_a$~Discrete($A_k$), otherwise $u_a$~Discrete($S_k$).

According to aspects of a Users-To-Follow Recommendation system or method according to an embodiment of the invention, a machine learning model is utilized for link prediction and label prediction. Link prediction concerns, for example, recommending a user to follow. Label prediction concerns, for example, classification of a link as either social or topical. The machine learning model utilizes a dataset based on network analysis, including analyzing existing user links and related link information for the existing links.

According to aspects of a Users-To-Follow Recommendation system or method according to an embodiment of the invention, a predicted or future link is provided to a user as a recommendation to follow, and based on the label, the Users-To-Follow Recommendation system or method also provides an intuitive explanation for the recommendation to follow, justifying the recommendation, for example by including common features or links related to the user, and authoritative features of the recommendation.

According to aspects of a Users-To-Follow Recommendation system or method according to an embodiment of the invention, the system or method performs network analysis, and builds the dataset for machine learning, by identifying and storing users and directed links between the users, along with information related to the users and the various links.

According to aspects of a Users-To-Follow Recommendation system or method according to an embodiment of the invention, the system or method provides a recommendation of a user to follow and an intuitive explanation why to follow the particular user.

According to aspects of a Users-To-Follow Recommendation system or method according to an embodiment of the invention, a machine learning model is utilized for link prediction and label prediction. Link prediction includes the task of estimating the likelihood of the existence of an unobserved link between two nodes, based on the other observable links around the two nodes and, when available, the attributes of the nodes in a network. As such, a network can be considered partially observable, and link prediction serves to predict or guess the unobserved parts. If the network is considered as evolving along time, the unobservable part of the network is the set of links which are not yet created. Link prediction relies on a social graph of the network observed at time t, to predict the set of links which will be created in the time interval [t, t+1].

According to aspects of a Users-To-Follow Recommendation system or method according to an embodiment of the invention, the system or method analyzes existing features i.e., the observable parts of the network, around a user, and another user, including, for example, existing links, user attributes, user interests, and user communities for each of the user and the another user.

According to aspects of a Users-To-Follow Recommendation system or method according to an embodiment of the invention, the system or method predicts a future link i.e., the unobservable parts of the network evolving along time, by predicting links to be created between the user and another user, based on the existing features of the network around the user and the another user. Future link creation includes, for example, a future link of the user linking to another user and a future link of another user linking to the user, based on existing links around the user and the another user and features of the another user.

According to aspects of a Users-To-Follow Recommendation system or method according to an embodiment of the invention, the system or method determines an explanation for the predicted link, i.e., a future link by identifying a likely origin of the link or the highest influence for the future link, by analyzing the relatedness of the future link to user communities and user interests. Based on the determined likely influence for the future link, the prediction system selects a recommendation type, between a topical recommendation type and a social recommendation type, based on the determined likely influence for the future link. Then, the prediction system determines an intuitive explanation for the future link based on the selected recommendation type and the likely influence for the linkage.

According to aspects of a Users-To-Follow Recommendation system or method according to an embodiment of the invention, the system or method presents, to the user, a link recommendation including the future link, the intuitive explanation, and an indication of the recommendation type and the likely influence. A recommendation engine may provide a recommendation to follow a user, for example, by recommending that the user follow another particular user, with an explanation for the recommendation. A recommendation engine may provide a suggestion to follow a user, for example, by suggesting that a user click if the user would like to follow another particular user, with an explanation for making the suggestion.

According to aspects of a Users-To-Follow Recommendation system or method according to an embodiment of the invention, the system or method predicts links, and for each predicted link the system or method decides whether the link is a "topical" or a "social" link, and depending on this decision the model produces a different type of explanation. The system or method determines an intuitive explanation for the future link based on the recommendation type being "topical" or "social." The system or method produces the explanation depending on the most likely or highest influence for the creation of the link. For example, if a link is more likely influenced by a user interest, for example a user interest in a topic in which the recommended user is authoritative, the explanation in this case may include a set of binary features describing the topic responsible for the link creation. As another example, if a link is more likely influenced by the shared user community, where the users share a large social neighborhood, the explanation includes a set of neighbors between the users which are more likely to be responsible for the link creation. The model provides a recommendation of a user to follow and a rationale for the recommendation of the user to follow based on the likely reason for the recommendation, resulting in a growing user base and a high level of engagement.

Predicted links include, for example, non-existing connections that are likely to be good connections. Each link recommendation type may be a topical or social recommendation type.

The recommendation system provides the predicted link to a user as a recommendation to follow, and based on the label, the recommendation system also provides an intuitive explanation for the recommendation to follow, justifying the recommendation, for example by including common features or links related to the user, and authoritative features of the recommendation.

The recommendation system performs network analysis, and builds the dataset for machine learning, by identifying and storing users and links between the users, along with related information. The information for the dataset may be gathered, for example, from social networking platforms in which link creation can be explained in terms of interest identity and/or personal social relations. The resulting dataset includes, for example, nodes, links, and features or attributes. Nodes include, for example, users of the social networking platform, or the like. Links include, for example, one-way, bidirectional, social, or topical links between users, or the like. Features or attributes include, for example, hashtags, mentions, tags, flags, used by users, or the like.

The system gathers information about the users, the links between the users, along with link directionality information, and user related information. Link related information may include, for example, link directionality information, timestamps of link creation or other types of information related to a link. User related information may include user content information and user adding, monitoring, or sharing activity information, for example, as related to user content. User related information may include user attribute information, for example, collected through user content, including for example, user posts, messages, hashtags, mentions, user declared information and the like. User posts may include, for example, text, website links, images and the like. User declared information may include, for example, user created information associated with the user or the user profile, or another user, such as a social relationship to another user, user created flags, categories, groups or classifications, user reported link information or classification, words or phrases, included in a post or message of a user, used to categorize posts or organize conversations around a theme, user names included in a post or message of a user, used to get another user's attention and associate the other user with the post or message, and the like. User content may include, for example, original, shared, forwarded, disseminated, viewed or consumed content. User content may include, for example, conversational, newsworthy or promotional content, and the like, and may also include, or may be combined with, for example, user thoughts, opinions, activities, preferences, reports, narratives, and the like. User content related information may be collected, including for example, user content, and related topics, groups, lists, such as ad hoc lists, and the like, along with the related rate or trend, which may, for example, indicate or identify features or interests related to the user or content, or group or classify user content, among other things.

The dataset may be constructed or configured to include, for example, nodes, links and features, including, or based on information indicating, one-way links, bidirectional links, social links, topical links, in-degree and out-degree information for the nodes, features, feature assignments, features per user, users per feature, and totals and averages of the same. As one example of an experimental setting, the model may, for example, assume a partial analysis or observation of the network and a complete set of user features.

The model is trained by splitting the dataset into training data and test data. The dataset can be split in various ways, for example randomly or based on features such as, for example, user, network, or dataset features.

The dataset may be randomly split into training and test data, by splitting the training and test data, for example, by 60/40, 70/30 and 80/20. The different proportions of training and test data may be measured for accuracy of the learned models, to track the robustness of the link prediction task over the size of the proportions, and to mitigate the effects of the random splits.

The dataset may be split into training and test data based on features. Dataset features may include, for example, a timestamp of creation of a link. In this case, the network can be chronologically split, where older links, for example, most, or 70% of the data, are used for training the model, and more recent links, for example, the remaining, or 30% of the data, are used for evaluating the model for prediction accuracy.

A link between a user and another user is predicted based on the tendency of the user to be either a source of the link or an adopter of the link, and the tendency of the user to appear as a destination of the link and the likelihood that a particular feature is adopted. The users and features of the dataset may be grouped according to their likelihood to belong to a particular community, for example a social community or a topical community. Specifically, for each user, the model computes the probability that a user is associated to a particular community as either a source or a destination of a connection, and as adopter of a particular feature. Additionally, for each user, the model computes the likelihood that a particular feature is observed in the context of the particular community.

Each user and feature is then associated with the particular community for which the probability is higher. Features or attributes may be determined based on hashtags, mentions, tags, flags, used by users, or the like. Social and topical connotations of features may also be analyzed, for example, by measuring, for a given feature, the social and topical connotations of features, for example by computing, for a particular feature, the probability of observing it in a social or topical context.

Features may be characterized, for example, by words or phrases, including, for example, "birthday," "family," "wedding," "party," "puppy," "HDR," "Polaroid," etc. For example, "birthday" and "family" are associated with social events and will produce a high social probability result, whereas "HDR" and "Polaroid" are associated with user topical interests and will produce a low social probability result.

The discovered communities capture patterns of connectivity among users. Patterns of connectivity may include, for example, topical connection patterns and social connection patterns. Topical connection patterns may be characterized, for example, by a corresponding set of particular features. Social connection patterns may be characterized, for example, by high density of links and higher entropy of features.

Explanations of recommendations play an important role in improving the user experience. Explanations increase the transparency of the recommendation process and positively contribute to gaining users' trust and satisfaction. An explanation increases the effectiveness of a recommendation, by showing the user why the recommendation is relevant. A user is more likely to follow a recommendation that is justified with an explanation, for example by including recommendation features common with or related to the user, or authoritativeness of the recommendation.

According to some embodiments a Users-To-Follow Recommendation system or method explains link creation by one of two main reasons: interest identity or personal social relations. This observation is rooted in sociology, under the common identity and common bond theory. Identity-based attachment holds when people join a community based on their interest in a well-defined common theme shared by all of the members of that community. The goal in this case may be information collecting and sharing in the specific theme of interest. People joining a community through identity-based links may not even directly participate, e.g., by producing content or by engaging with other members, and instead only passively consume information. Conversely, bond-based attachment is driven by personal social relations with other specific individuals (e.g., family, friends, colleagues), and thus it does not require a common theme of interest to be justified. Bond-based links are usually reciprocated, while identity-based links are much more directional, where the direction is given by the level of authoritativeness of the user on the theme. The two types of links create two different types of communities, "topical" or identity-based, and "social" or bond-based.

According to aspects of some embodiments of a Users-To-Follow Recommendation system or method according to an embodiment of the invention, the system or method provides a stochastic model, which predicts links, and for each predicted link the model decides whether it is a topical or a social link, and depending on this decision it produces a different type of explanation.

A topical link u→v (u should follow v) is recommended to u when v is authoritative in a topic in which u has demonstrated interest. In this case the explanation is a set of the top-k binary features (e.g., tags, hashtags or other user labels or categories or the like) describing the topic of authoritativeness of v, which makes v a potential source of interesting information for u. A social link u→v instead is recommended when u and v are already part of the same social community, i.e., the users have many contacts in common. In this case the explanation is the set of the top-k common neighbors with respect to the likelihood of being responsible for the link creation.

As a by-product, Users-To-Follow Recommendation system or method also implicitly detects communities and their type (social or topical).

Specifically, the Users-To-Follow Recommendation system or method is a Bayesian topic model defined over directed and nodes-attributed graphs. In Users-To-Follow Recommendation system or method each link creation and each attribute adoption by a node are explained with respect to a finite number of latent factors. These latent factors can be abstractly thought as topics or communities and the terms latent factors, topics and communities are used interchangeably herein.

The terms latent factor, topic, and community may be used interchangeably herein.

Each community is characterized by a level of sociality and topicality. Social communities are characterized by high density and reciprocity of links, whereas topical communities are characterized by low entropy in the features and by the presence of authoritative users on the relevant topic. Each user may be involved in different communities to different extents and with different roles. These components are modeled by three different multinomial distributions over the set of users, modeling their sociality, authoritativeness and interest in each topic.

Finally, each topic is characterized by a multinomial distribution over the feature set, which provide a semantic interpretation of the topic.

A Users-To-Follow Recommendation system or method according to an embodiment of the invention, may be applied, and is especially beneficial, in networks, including social networks and blogging networks, directed to reflect user interests towards authoritative information sources. The model is beneficial to users of such networks whether the users participate in the exchange of information, by contributing or disseminating information, or merely consume information contributed by other users.

According to aspects of a Users-To-Follow Recommendation system or method according to an embodiment of the invention, the system or method analyzes online social networking platforms, where users build and maintain social connections, share information, and follow updates from other users. Such a network is represented as a directed graph, where each node is a user and it has associated a set of binary features, representing the interests of the user.

For example, let G=(V,E) be the social graph where V is a set of n users, E⊆V×V is a set of m directed arcs, and (u, v) indicates that u follows v and hence he is notified of v's activities.

The neighborhood of a node is denoted as u as N(u)={v∈V: (u, v)∈E ∨ (v, u)∈E}. Further, let F denote a set of h binary features. A binary n×h matrix F is given such that $F_{u,f}=1$ when user u is interested in the feature f. This case may also be denoted as (u, f)∈F. Finally, we denote all the features of the node u as F(u)={f∈F: (u, f)∈F} and the set of all the nodes having attribute f as V(f)={u∈V: (u, f)∈F}.

According to aspects of a Users-To-Follow Recommendation system or method according to an embodiment of the invention, the system or method includes two main types of behavior in creating connections in a social network. The "topical" behavior, in which a user u decides to follow another user v because of u's interest in a topic in which v is authoritative; and the "social" behavior in which u follows v because they know each other in the real world, or they have many common contacts in the social network. In the topical behavior case, two distinct roles for a user can be further identified, either as authoritative ("influential") for the topic or just interested ("susceptible") in the topic. In the social case, instead, there are no specific roles, but a generic tendency to connect among the users of a close-knit circle.

The structure of the network, including the links, and the features of the nodes, can be explained by introducing a set of latent factors representing users' interests, and by labeling the links as either social or topical. A unique stochastic topic model is constructed, based on the following: links can be explained by different latent factors (overlapping communities); social links tend to be reciprocal and communities characterized by a high level of sociality exhibit high density; topical links tend to exhibit a clear directionality and topical communities are characterized by a high level of topicality exhibit low entropy on the set of features assigned to nodes. The stochastic model is formalized by introducing a stochastic process where each observation, either a social link or adoption of a feature by a node, is generated by a random mixture of latent variables. For example, the degree of involvement and role of user u in the community/topic k is governed by three parameters: (1) $A_{k,u}$ which measures the degree of the authoritativeness of u in k; (2) $S_{k,u}$ which measures the degree of interest u in the topic k, or in other terms, the likelihood of following users that are authoritative in k (susceptibility to social influence); and (3) $\theta_{k,u}$ denotes the social tendency of u, i.e., her likelihood to connect to other social peers within community k. Moreover, each latent factor k is characterized by a propensity to adopt certain features in F over others, where such a propensity is formalized by means of a weight $\Phi_{k,f}$, denoting the importance of feature f within k.

The above mentioned components can be accommodated in a mixture membership model, for example, expressed in a Bayesian setting, to define distributions governing the stochastic process, given some prior hypotheses. Bayesian modeling may be applied when the underlying data is characterized by high scarcity, as it may allow better control of the priors, which govern the model, and prevents overfitting.

According to aspects of a Users-To-Follow Recommendation system or method according to an embodiment of the invention, the system or method includes a stochastic model configured for joint modeling of links and feature associations and directly models each observed social link (u, v)∈E or adoption of feature by a node (u, f)∈F, introducing random variables on the source/destination of these observations. That is, for each link (u, v)∈E models the likelihood that there exists a latent factor k, such that u has high probability of being a source, while v has high probability of being a destination. The model further introduces a latent variable $x_{u,v}$, which encodes the (social/topical) nature of an existing link. Analogously, the adoption of an observed feature association (u, f)∈F may be explained by a latent factor k and by the status of the latent variable $y_{u,f}$ which represent the role of the user u, either as authoritative or just interested, when adopting the feature f.

The underlying generative process for social links and adoption of features depends jointly on the components θ, A, S and Φ, as described in FIG. 10. The same process is depicted in plate notation in FIG. 9, which provides a graphical view of the casual dependencies among latent and observed variables.

The generation of a link changes depending on the status of the latent variable $x_l$. A social connection l=(u, v) can only be observed if, by picking a latent community k, u and v have high degrees of social attitude $\theta_{k,u}$ and $\theta_{k,v}$. Conversely, a topical connection can only be observed if, by picking a latent community k, u has a high degree of activeness $A_{k,u}$ and v have a high degree of passive interest $S_{k,u}$. Notably, the likelihood of observing the reciprocal link (v, u) is equally likely in case of social connection, while it is different in a topical context, and hence reflects the design assumption on the directionality of links in social/topical communities. Each link is finally generated by taking into account the social/topical mixture of each community. Similarly, the probability of observing a node-feature pair a=(u, f)∈F depends on the degree of authoritativeness/susceptibility of the user and by the likelihood of observing the attribute f within each latent factor k.

According to aspects of a Users-To-Follow Recommendation system or method according to an embodiment of the invention, the system or method includes a procedure for inference and parameter estimation and machine learning. The procedure for inference and parameter estimation and machine learning may utilize counters shown in Table 1, among other counters. The counters may be used along with algebraic manipulations to infer relationships between links, latent factors and feature assignments.

TABLE 1

| Description |
| --- |
| Number of links associated with community k |
| Number of social links |
| Number of topical links |
| Number of social links associated with community k |
| Number of topical links associated with community k |
| Number of social links associated with community k where u is the source |
| Number of social links associated with community k where u is the destination |
| Number of topical links associated with community k where u is the source |
| Number of topical links associated with community k where u is the destination |

TABLE 1-continued

Description

Number of feature-assignments associated with community k
Number of authoritative feature-assignments
Number of susceptible feature-assignments
Number of feature-assignments within community k on authoritative users
Number of feature-assignments within community k on susceptible users
Number of recipients associated with community k relative to feature f
Number of features associated with community k where u is the authoritative source
Number of features associated with community k where u is the susceptible source User engagement plays a crucial role in social networking platforms, and it can be strengthened by supporting users in accessing relevant information and establishing new adequate connections. Recommender systems are beneficial used in this context, as they selectively address the information overhead typical of online social networks and enable access to ad-hoc personalized content. However, the success of a recommender system does not only depend on its accuracy in inferring and exploiting users' interests, but it also relies on how the deployed recommendations are perceived. The user's decision to adopt a recommendation can be positively influenced by providing intuitive explanations on why the recommendation was generated. Explanations increase the transparency of the recommendation process and may positively contribute in gaining users' trust and satisfaction.

According to aspects of a Users-To-Follow Recommendation system or method according to an embodiment of the invention, the system or method includes, in the context of link prediction and recommendation, a first intuitive explanation consisting in the nature (either social or topical) of the link. The Users-To-Follow Recommendation engine or model provides a natural way to classify each possible connection l=(u,v) as either social or topical, for example, expressed by Equations (1) and (2), respectively:

$$Pr(x_l=1|l,\theta) \propto \Sigma \pi_k \delta_k \theta_{k,u} \theta_{k,v}$$ Equation (1)

$$Pr(x_l=0|l,\theta) \propto \Sigma \pi_{k(1-\delta k)} S_{k,u} A_{k,v}$$ Equation (2)

In Equations (1) and (2) above, $\theta$ denotes the status of distributions, $\theta=(\Pi, \delta, m, \theta, A, S)$, described with respect to FIG. 9 above.

Social connections have also a natural explanation in terms of close-knit circles, represented by all those users who are likely to be connected to both the tiers of the prospective link. Thus, for a given link l=(u; v) predicted as social (i.e., such that xl=1), an explanation is provided based on the set of the top ranked, most prospective common neighbors. A rank that promotes common neighbors that have high degree of involvement in social communities where both u and v are involved may be used.

Conversely, topical links can be explained through a list of attributes which are representative of the topics of interest by the current user and for which the recommended connection has high authority. Again, a score can be expressed for each common feature, and the features may be ranked, based on, for example, the topical involvement, either authoritative or susceptible, of the user u within community k. Such ranks can be interpreted in terms of the prospective triangle among (u,v), (u, f) and (v, f). For topical links, the directionality plays a role, because only those features for which v is authoritative are relevant.

According to aspects of a Users-To-Follow Recommendation system or method according to an embodiment of the invention, the system or method includes recommending who to follow in online social networks while providing a contextualized explanation for each recommendation.

Recommending which users to follow (or connect to), is a fundamental functionality common to all on-line social networking platforms.

Recommendations help users having a quicker start in building their networks, thus driving engagement and loyalty and a key component for growth and sustenance of a social network. The likelihood that a recommendation is adopted increases if it is enriched with explanations. However, existing systems for recommending people to follow do not implement any explanation policy, except listing, for each recommended user, all the common friends.

According to aspects of a Users-To-Follow Recommendation system or method according to an embodiment of the invention, the system or method is based on the observation, rooted in sociology, that the creation of a link is explainable by one of two main reasons. A topical reason, when people join a community based on their interest in a well-defined common theme and a social reason, when creation of a link is driven by personal social relations with other specific individuals (e.g., family, friends, colleagues), and thus does not require a common theme of interest to be justified.

According to aspects of a Users-To-Follow Recommendation system or method according to an embodiment of the invention, the system or method is based on a stochastic model, which not only predicts links (non-existing connections that are likely to be good connections), but for each predicted link it decides whether it is a topical or a social link, and depending on this decision it produces a different type of explanation. A topical link u→v (u should follow v) is usually recommended to u when v is authoritative in a topic in which u has demonstrated interest. In this case the explanation is a set of the top-k binary features (e.g., tags or hash-tags) describing the topic of authoritativeness of v, which makes v a potential source of interesting information for u. A social link u→v instead is recommended when u and v are already part of the same social community, i.e., they have many contacts in common. In this case the explanation is the set of the top-k common neighbors with respect to the likelihood of being responsible for the link creation.

According to aspects of a Users-To-Follow Recommendation system or method according to an embodiment of the invention, the system or method relates to online social networking platforms, where users build and maintain social connections, share information, and follow updates from other users, represented as a directed graph, where each node is a user and it has associated a set of binary features, representing the interests of the user (hashtags, tags).

Following the common identity and common bond theory, there are two main types of behavior in creating connections in a social network. The topical behavior, in which a user u decides to follow another user v because of u's interest in a topic in which v is authoritative, and the social behavior in which u follows v because they know each other in the real world, or they have many common contacts in the social network. In the topical behavior case we can further identify two distinct roles for a user, either as authoritative or influential for the topic, or just interested or susceptible in the topic. In the social case, instead, there are no specific roles.

According to aspects of a Users-To-Follow Recommendation system or method according to an embodiment of the invention, the system or method includes link prediction, where given a snapshot of a social network, new interactions among its members are inferred, that are likely to occur in the near future, and link labeling, which includes inferring the nature of a link, i.e., deciding whether a link is either social or topical.

According to aspects of a Users-To-Follow Recommendation system or method according to an embodiment of the invention, the system or method includes community labeling and summarization by identifying connected groups of users within the social network, labeling each group as either social or topical and providing a summary of the interests of users in the considered community. The system or method additionally includes, for example, identifying of authoritative and susceptible users for each community, producing explanations for each predicted link u→v, by providing the user u with a concise explanation about why he should follow v.

According to aspects of a Users-To-Follow Recommendation system or method according to an embodiment of the invention, the system or method includes modeling the structure of the network, including the links, and the features of the nodes, by introducing a set of latent factors representing users interests, and by labeling the links as either social or topical, by applying a unique stochastic topic model, which is based on the following assumptions. Links can be explained by different latent factors. Social links tend to be reciprocal and communities characterized by a high level of sociality exhibit high density. Topical links tend to exhibit a clear directionality and topical communities are characterized by a high level of topicality and exhibit low entropy on the set of features assigned to nodes. The stochastic process formalizes these assumptions, where each observation, either a social link or adoption of a feature by a node, is generated by a random mixture of latent variables. Specifically, the degree of involvement and role of user u in the community/topic k is governed by three parameters or measures, the degree of the authoritativeness of u in k, the degree of interest of u in the topic k, or in other terms, the likelihood of following users that are authoritative in k (i.e., susceptibility to social influence), and the social tendency of u, i.e., her likelihood to connect to other social peers within community k. Moreover, each latent factor k is characterized by a propensity to adopt certain features over others. These components can accommodated in a mixture membership model expressed in a Bayesian setting, better suited when the underlying data is characterized by high scarcity. A procedure for inference and parameter estimation may be based on collapsed Gibbs sampling. After fitting the model, the system can generate intuitive and concise explanations for each predicted link. If the link (u→v) is labeled as social, then explanation is provided in terms of close-knit circles, represented by the top-K most prospective common neighbors for both (u) and (v). Further, topical links can be explained through a list of features which are representative of the topics of interest by the current user and for which the recommended connection has high authority.

The success of a recommender system does not only depend on its accuracy in inferring and exploiting users interests, but it also relies on how the deployed recommendations are perceived. The user's decision to adopt a recommendation can be positively influenced by providing intuitive explanations on why the recommendation was generated.

According to aspects of a Users-To-Follow Recommendation system or method according to an embodiment of the invention, the system or method provides accurate suggestions about people to follow in an online social network and contextualized socio/topical explanations to support each recommendation.

According to aspects of a Users-To-Follow Recommendation system or method according to an embodiment of the invention, the system or method implicitly extracts communities that can be labeled as either topical or social and that can be summarized by extracting their main topics. The identification of authoritative users for each community opens new application scenarios. For example, the system provider could increase the engagement of those authoritative users with the system by offering premium services or promotions.

While the invention is described with reference to the above drawings, the drawings are intended to be illustrative, and the invention contemplates other embodiments within the spirit of the invention.

What is claimed is:

1. A computing device comprising:
   a processor; and
   memory comprising processor-executable instructions that when executed by the processor cause performance of operations, the operations comprising:
      collecting features associated with a plurality of users of a social network including a first user and a second user;
      storing the features in a database;
      analyzing the database to determine linkages between users based upon the features, wherein the linkages includes a linkage between the first user and the second user;
      responsive to determining that the linkage between the first user and the second user exceeds a first threshold, generating an electronic recommendation for the first user to follow the second user, wherein the generating comprises:
         responsive to determining that a strength of a social linkage between the first user and the second user exceeds a strength of a topical linkage between the first user and the second user, generating, as at least part of the electronic recommendation, a first explanation of the social linkage between the first user and the second user, wherein the first explanation is indicative of one or more social connection links between the first user and the second user; and
      controlling a graphical user interface of the first user to display the electronic recommendation.

2. The computing device of claim 1, wherein the features comprise at least one of one or more profiles, one or more interests or one or more activities.

3. The computing device of claim 1, wherein the linkage between the first user and the second user exceeding the first threshold corresponds to the linkage between the first user and the second user exceeding one or more linkages between the first user and one or more other users.

4. The computing device of claim 1, the operations comprising:
   determining the linkage based upon at least one of:
      a predicted probability of the first user accepting a recommendation to follow the second user; or
      a predicted affinity of the first user with respect to the second user.

5. The computing device of claim 1, the operations comprising:
   determining the social linkage based upon at least one of a common bond between the first user and the second user, one or more social personal connections between the first user and the second user, a density of links exceeding a second threshold or a reciprocity of links exceeding a third threshold.

6. The computing device of claim 1, the operations comprising:
   determining the topical linkage based upon an interest in a topic; and
   responsive to determining that the strength of the topical linkage between the first user and the second user exceeds the strength of the social linkage, generating, as at least part of the electronic recommendation, a second explanation of the topical linkage between the first user and the second user.

7. The computing device of claim 1, wherein the one or more social connection links indicated in the first explanation comprise one or more common contacts between the first user and the second user.

8. A method, implemented via a computer comprising a processor, comprising:
   collecting features associated with a plurality of users of a social network including a first user and a second user;
   storing the features in a database;
   analyzing the database to determine linkages between users based upon the features, wherein the linkages includes a linkage between the first user and the second user;
   responsive to determining that the linkage between the first user and the second user exceeds a first threshold, generating an electronic recommendation for the first user to follow the second user, wherein the generating comprises:
      responsive to determining that a strength of a first linkage between the first user and the second user exceeds a strength of a second linkage between the first user and the second user, generating, as at least part of the electronic recommendation, a first explanation of the first linkage between the first user and the second user, wherein the first explanation is indicative of one or more social connection links between the first user and the second user, wherein the first linkage is different than the second linkage; and
   controlling a graphical user interface of the first user to display the electronic recommendation.

9. The method of claim 8, wherein the features comprise at least one of one or more profiles, one or more interests or one or more activities.

10. The method of claim 8, wherein the linkage between the first user and the second user exceeding the first threshold corresponds to the linkage between the first user and the second user exceeding one or more linkages between the first user and one or more other users.

11. The method of claim 8, comprising:
   determining the linkage based upon at least one of:
      a predicted probability of the first user accepting a recommendation to follow the second user; or
      a predicted affinity of the first user with respect to the second user.

12. The method of claim 8, comprising:
   determining the first linkage based upon at least one of a common bond between the first user and the second user, one or more social personal connections between the first user and the second user, a density of links exceeding a second threshold or a reciprocity of links exceeding a third threshold.

13. The method of claim 8, comprising:
   determining the second linkage based upon an interest in a topic; and
   responsive to determining that the strength of the second linkage between the first user and the second user exceeds the strength of the first linkage, generating, as at least part of the electronic recommendation, a second explanation of the second linkage between the first user and the second user.

14. The method of claim 8, wherein the one or more social connection links indicated in the first explanation comprise one or more common contacts between the first user and the second user.

15. A non-transitory computer readable medium comprising instructions that when executed cause performance of operations, the operations comprising:
   collecting features associated with a plurality of users of a social network including a first user and a second user;
   storing the features in a database;
   analyzing the database to determine linkages between users based upon the features, wherein the linkages includes a linkage between the first user and the second user;
   responsive to determining that the linkage between the first user and the second user exceeds a first threshold, generating an electronic recommendation for the first user to follow the second user, wherein the generating comprises:
      responsive to determining that a strength of a topical linkage between the first user and the second user exceeds a strength of a social linkage between the first user and the second user, generating, as at least part of the electronic recommendation, a first explanation of the topical linkage between the first user and the second user; and
   controlling a graphical user interface of the first user to display the electronic recommendation.

16. The non-transitory computer readable medium of claim 15, wherein the features comprise at least one of one or more profiles, one or more interests or one or more activities.

17. The non-transitory computer readable medium of claim 15, wherein the linkage between the first user and the second user exceeding the first threshold corresponds to the linkage between the first user and the second user exceeding one or more linkages between the first user and one or more other users.

18. The non-transitory computer readable medium of claim 15, the operations comprising:
   determining the linkage based upon at least one of:
      a predicted probability of the first user accepting a recommendation to follow the second user; or
      a predicted affinity of the first user with respect to the second user.

19. The non-transitory computer readable medium of claim 15, the operations comprising:
   determining the social linkage based upon at least one of a common bond between the first user and the second user, one or more social personal connections between the first user and the second user, a density of links exceeding a second threshold or a reciprocity of links exceeding a third threshold; and
   responsive to determining that the strength of the social linkage between the first user and the second user exceeds the strength of the topical linkage, generating, as at least part of the electronic recommendation, a second explanation of the social linkage between the first user and the second user, wherein the second explanation is indicative of one or more social connection links between the first user and the second user.

20. The non-transitory computer readable medium of claim 15, the operations comprising:

determining the topical linkage based upon an interest in a topic.

* * * * *